United States Patent
Bright et al.

(10) Patent No.: US 6,850,782 B2
(45) Date of Patent: Feb. 1, 2005

(54) WIRELESS DEVICE WITH VIBRATIONAL COMMUNICATION CAPABILITIES

(75) Inventors: Walter G. Bright, Kirkland, WA (US); G. Eric Engstrom, Kirkland, WA (US)

(73) Assignee: Wildseed Ltd., Kirkland, WA (US)

( * ) Notice: Subject to any disclaimer, the term of this patent is extended or adjusted under 35 U.S.C. 154(b) by 510 days.

(21) Appl. No.: 09/817,732

(22) Filed: Mar. 26, 2001

(65) Prior Publication Data

US 2002/0165013 A1 Nov. 7, 2002

Related U.S. Application Data

(63) Continuation-in-part of application No. 09/767,587, filed on Jan. 22, 2001.

(51) Int. Cl.[7] ................................................. H04B 1/38

(52) U.S. Cl. ..................... 455/567; 455/566; 455/557; 340/7.6; 340/7.61

(58) Field of Search ............................. 455/550.1, 567, 455/557, 556.1, 566; 340/7.6, 407.1, 407.2, 7.61, 7.62

(56) References Cited

U.S. PATENT DOCUMENTS

| 5,263,195 A | 11/1993 | Panther et al. |
| 5,721,783 A | 2/1998 | Anderson |
| 6,573,825 B1 * | 6/2003 | Okano ........................ 340/7.51 |
| 2002/0160818 A1 * | 10/2002 | Nelson et al. ............... 455/566 |

FOREIGN PATENT DOCUMENTS

| JP | 409248315 A | 9/1997 | |
| JP | 11-331407 | * 11/1999 | .......... H04M/11/00 |

* cited by examiner

Primary Examiner—Lee Nguyen
(74) Attorney, Agent, or Firm—Schwabe, Williamson & Wyatt, P.C.

(57) ABSTRACT

A wireless communication device having vibrational communication capabilities in accordance with various embodiments is provided including a receiver to receive signals, a body casing, a vibrator coupled to the body casing to vibrate the wireless communication device, a storage medium having stored therein a plurality of programming instructions, which when executed cause the wireless communication device to vibrationally output received alphanumeric data through vibrational manifestation of the received alphanumeric data using the vibrator, and an execution unit coupled to the storage medium for executing the plurality of programming instructions.

38 Claims, 10 Drawing Sheets

WIRELESS DEVICE WITH VIBRATIONAL COMMUNICATION CAPABILITIES

RELATED APPLICATIONS

This application is a continuation-in-part of U.S. patent application Ser. No. 09/767,587 entitled "A Wireless Mobile Phone With Morse Code and Related Capabilities" filed on Jan. 22, 2001 by Walter G. Bright, et al., and commonly assigned to the assignee of the present application.

BACKGROUND OF THE INVENTION

1. Field of the Invention

The present invention relates to the field of wireless communication devices. More specifically, the present invention relates to complementary features that enhance the usability of these devices.

2. Background Information

Advances in integrated circuit and telecommunication technology have led to wide spread adoption of wireless mobile client devices including wireless mobile phones, pagers, and personal digital assistants to name just a few. Such wireless communication devices offer the advantage of enabling their users to be communicatively reachable by their business associates, friends and family members, wherever the users may be, as long as they are within the reach of an associated service network. Thus, even non-professionals are increasingly dependent on their wireless devices to meet their communication needs.

With increased usage and reliance, often times, wireless mobile phone users would find themselves in the dilemma of having to engage in potentially sensitive conversations in a setting that is less than desirable, privacy-wise. For examples, a user may find himself/herself having to engage in an urgent personal or business conversation at a bus stop while waiting for the next bus, or at an airport terminal while waiting to board his/her flight. Under the prior art, a user may have to elect to continue the private/sensitive conversation in a less than private manner, switch to another form of communication, such as email, or delay the communication. Each of these options has disadvantages. Electing to proceed with the conversation in a less than private manner may unduly expose private/sensitive information to the public, while switching communication form is inconvenient. Even if the user is in possession of a wireless mobile phone capable of sending and receiving emails, any switching would likely at a minimum, disrupt the continuity of the communication.

Furthermore, there are times when it may not be possible or convenient for an individual to answer or attend to a wireless device when a message arrives, yet it may nonetheless be important or even critical that the individual receive the message. For example, an individual may be expecting a very important message by way of his or her wireless device, but in the case of a mobile phone, may not be able to answer the phone, or in the case of a wireless pager or PDA, may not be able to retrieve the device e.g. out of a pocket to view the message. Such may often be the case while individuals are driving vehicles, carrying objects, or participating in any number of activities that require the use of both hands or may otherwise render the option of verbal communication unavailable. For example, when the user is driving and does not wish the passengers to hear the conversation and/or message, or the user is in a meeting, attending a conference, or any one of a number of "performances" (movie, opera, symphony and the like).

Therefore, a more user-friendly approach to accommodating privacy sensitive communication is desired.

Note: The term "wireless mobile phone" as used in herein (in the specification and in the claims) refers to the class of telephone devices equipped to enable a user to make and receive calls wirelessly, notwithstanding the user's movement, as long as the user is within the communication reach of a service or base station. The term "wireless mobile phone" is to include the analog subclass as well as the digital subclass (of all signaling protocols).

SUMMARY OF THE INVENTION

A wireless communication device having vibrational communication capabilities is provided in accordance with various embodiments. In one embodiment of the invention a wireless mobile phone is provided including a body casing, a transceiver to send and receive signals including alphanumeric data, a vibrator coupled to the body casing to vibrate the wireless mobile phone, a storage medium having stored therein a plurality of programming instructions, which when executed cause the wireless mobile phone to vibrationally output received alphanumeric data through vibrational manifestation of the received alphanumeric data using the vibrator, and an execution unit coupled to the storage medium for executing the plurality of programming instructions.

In another embodiment of the invention a wireless pager is provided including a receiver to receive signals, a body casing, a vibrator coupled to the body casing to vibrate the wireless communication device, a storage medium having stored therein a plurality of programming instructions, which when executed cause the wireless communciation device to vibrationally output received alphanumeric data through vibrational manifestation of the received alphanumeric data using the vibrator, and an execution unit coupled to the storage medium for executing the plurality of programming instructions.

In yet another embodiment of the invention a personal digital assistant (PDA) is provided including a receiver to receive signals, a body casing having front surface, a vibrator coupled to said body casing to vibrate the PDA, a storage medium having stored therein a plurality of programming instructions, which when executed cause the PDA to vibrationally output received alphanumeric data through vibrational manifestation of the received alphanumeric data using the vibrator, and an execution unit coupled to the storage medium for executing the plurality of programming instructions.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention. The phrase "in one embodiment" will be used repeatedly, however the phrase does not necessarily refer to the same embodiment, although it may.

Figure 1A:
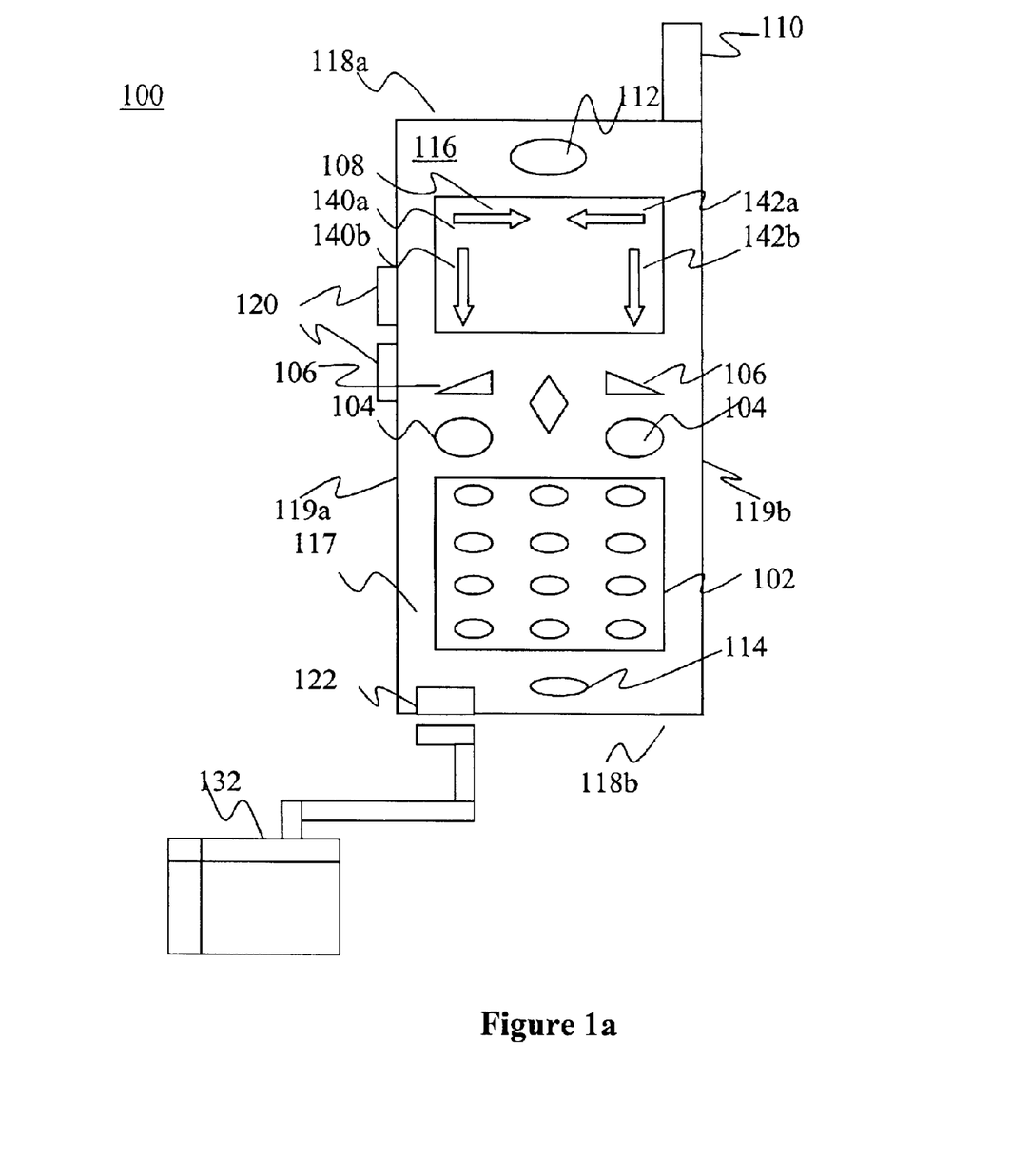
FIGS. 1a–1b illustrate a wireless mobile phone of the present invention, incorporated with the Morse code facilities in accordance with the present invention, in accordance with two embodiments.
Figure 1B:
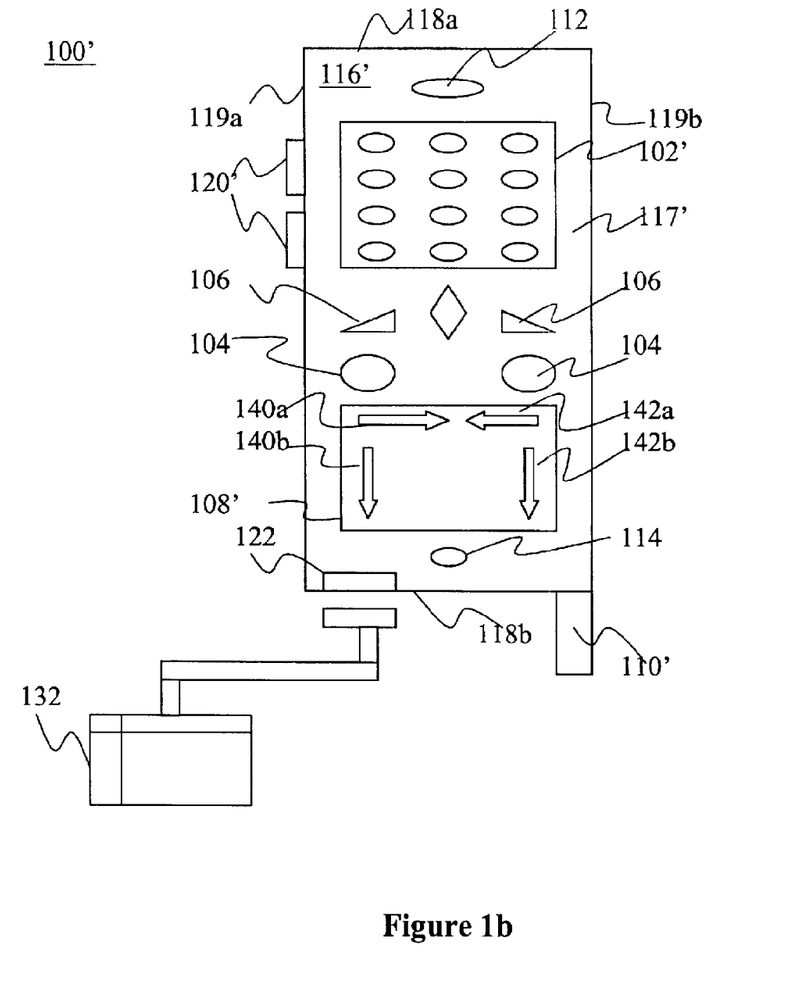

Referring now to FIGS. 1a–1b, wherein two embodiments of a wireless mobile phone 100 and 100', incorporated with the teachings of the present invention are shown. As illustrated, in accordance with the present invention, wireless mobile phone 100/100' is provided with two extra buttons 120 and complementary logic (shown as ref. 330 in FIG. 3) to facilitate a user of phone 100/100' to enter and send alphanumeric data, e.g. a text message. More specifically, buttons 120 in conjunction with the complementary logic facilitate a user in entering alphanumeric data through entry of their Morse code representations (see Tables I–III), and causing the entered alphanumeric data to be sent. One of buttons 120 is provided to allow a user to enter the "dit" representation, while the other is provided to allow the user to enter the "dah" representation. The facilities may be employed in particular during a call, thereby enabling the user to conduct all or a portion of a call in a non-audible and more private manner.

TABLE I

Morse Codes for Letters

| Letters | Morse Code |
|---|---|
| A | ditdah |
| B | dahditditdit |
| C | dahditdahdit |
| D | dahditdit |
| E | dit |
| F | ditditdahdit |
| G | dahdahdit |
| H | ditditditdit |

TABLE I-continued

Morse Codes for Letters

| Letters | Morse Code |
|---|---|
| I | ditdit |
| J | ditdahdahdah |
| K | dahditdah |
| L | ditdahditdit |
| M | dahdah |
| N | dahdit |
| O | dahdahdah |
| P | ditdahdahdit |
| Q | dahdahditdah |
| R | ditdahdit |
| S | ditditdit |
| T | dah |
| U | ditditdah |
| V | ditditditdah |
| W | ditdahdah |
| X | dahditditdah |
| Y | dahditdahdah |
| Z | dahdahditdit |

TABLE II

Morse Code for Numbers

| Numbers | Morse Code |
|---|---|
| 0 | dahdahdahdahdah |
| 1 | ditdahdahdahdah |
| 2 | ditditdahdahdah |
| 3 | ditditditdahdah |
| 4 | ditditditditdah |
| 5 | ditditditditdit |
| 6 | dahditditditdit |
| 7 | dahdahditditdit |
| 8 | dahdahdahditdit |
| 9 | dahdahdahdahdit |

TABLE III

Morse Codes for Punctuations

| Punctuations | Morse Codes |
|---|---|
| / (slash) | dahditditdahdit |
| , (comma) | dahdahditditdahdah |
| . (period) | ditdahditdahditdah |
| ? (question mark) | ditditdahdahditdit |

In one embodiment, the conventional operational setting selection feature of phone 100/100' is enhanced to facilitate a user in selecting an operational rate for processing and interpreting Morse codes, e.g. 5 wpm, 13 wpm, 20 wpm and so forth. The different operational rates facilitate usage by users of varying skill levels, from the novice users to the more advanced users.

Preferably, buttons 120 are strategically placed on a side surface of phone 100/100' to facilitate single-handed operation of phone 100/100'. That is, with the side surface placement of buttons 120, a user may e.g. use two fingers of the same hand holding phone 100/100' to manipulate buttons 120 to enter alphanumeric data of a text message to be transmitted by entering their Morse codes. Thus a user may be holding phone 100/100', engage in a verbal conversation, and switch to sending the other calling party a non-verbal text message, and then switch back to verbal conversation, all performed without changing the position of phone 100/100' or altering the manner phone 100/100' is held. Phone 100/100' may be held next to the user's ear or in any arbitrary position if an earpiece or a speaker is used.

For the illustrated embodiments, which are designed for right-handed users, buttons 120 are strategically placed on left side surface 119a of body casing 116 of phone 100/100'. In alternate embodiments, designed for left-handed users, buttons 120 may be strategically placed on right side surface 119b of body casing 116 of phone 100/100' instead. In yet other alternate embodiments, buttons 120 may be placed on the top surface at top end 118a.

Beside side surfaces 119a and 119b, and top end 118a, body casing 116 also has bottom end 118b as well as front surface 117/117'. Note that side surfaces 119a and 119b, top and bottom ends 118a and 118b, and front surface 117/117' are all objectively determined. As illustrated, wireless mobile phone 100/100' also includes display 108/108'. Such a device necessarily has a reading orientation. By definition, the surface the display is disposed is the front surface. The front surface in turns definitively defines the left side surface and the right side surface. Further, such a device necessarily has a display orientation, which definitively defines top and bottom ends 118a and 118b. For example, textual data are either rendered from left to right and top to bottom, as denoted by arrows 140a and 140b, as in the case of the English language, or right to left and top to bottom, as denoted by arrows 142a and 142b, as in the case of the Hebrew language, or top to bottom and right to left, as denoted by arrows 142b and 142a, as in the case of the Chinese language. Thus the manner in which textual data are rendered definitively defines which end is the top end, and which end is the bottom end. Moreover, an element A of phone 100/100' will necessarily be considered as above element B of phone 100/100', and element B will necessarily be considered as below or beneath element A, if element A is closer to the objectively determinable top end of phone 100/100' (or element B is closer to the objectively determinable bottom end of phone 100/100').

Continuing to refer to FIGS. 1a–1b, beside buttons 120 and the complementary logic, phone 100/100' is otherwise intended to represent a broad range of wireless mobile phones, including both the analog as well as the digital types (of all signaling protocols). In addition to buttons 120, the complementary logic, body casing 116/116' and display 108/108' phone 100/100' further includes standard input key pad 102/102' having a number of conventional alphanumeric keys, "talk" and "end talk" buttons 104, cursor control buttons 106, antenna 110/110', ear speaker 112, microphone 214 and adapter interface 122.

The two embodiments differ in the relative disposition of antenna 110/110' to ear speaker 112, and the relative disposition of keypad 102/102' to display 108/108'. In the first embodiment, similar to conventional prior art wireless mobile phones, antenna 110 and ear speaker 112 are both disposed near top end 118a, whereas in the second embodiment, unlike conventional prior art wireless mobile phones, antenna 110' is disposed near bottom end 118b while ear speaker 112 is disposed near top end 118a. Further, in the first embodiment, similar to conventional prior art wireless mobile phones, keypad 102 is disposed in the lower half of phone 100 beneath display 108, whereas in the second embodiment, unlike conventional prior art wireless mobile phones, keypad 102' is disposed in the upper half of phone 100' above display 108'. In other words, except for Morse code buttons 120 and the associated complementary logic of the present invention, the first embodiment represents a wide range of wireless mobile phones known in the art. Similarly, except for Morse code buttons 120 and the associated complementary logic of the present invention, the second embodiment is disclosed in co-pending U.S. patent application Ser. No. 09/767,526, entitled "A Wireless Mobile Phone with Inverted Placement of Antenna and Keypad", which is hereby fully incorporated by reference.

Further, for the illustrated embodiments, each of buttons 120 includes light emitting diodes (LED). The LEDs are employed by the complementary logic to visually echo the Morse code representations of alphanumeric data entered through input keypad 102/102', thereby facilitating a user in learning Morse code. In various embodiments, the present invention also contemplates the conventional operational setting feature of phone 100/100' will further be enhanced to facilitate enabling/disabling of this "learn mode".

Additionally, as alluded to earlier, phone 100/100' includes adapter interface 122 for removably attaching a variety of accessory devices to phone 100/100'. Among these removably attachable accessory devices include e.g. ear piece (not shown), and vibration device 132. Thus, with the attachment of vibration device 132, the complementary logic may vibrationally output received alphanumeric data through vibrational manifestations of their corresponding Morse code representations. As a result, a user may silently and vibrationally receive a text message.

Figure 2A:
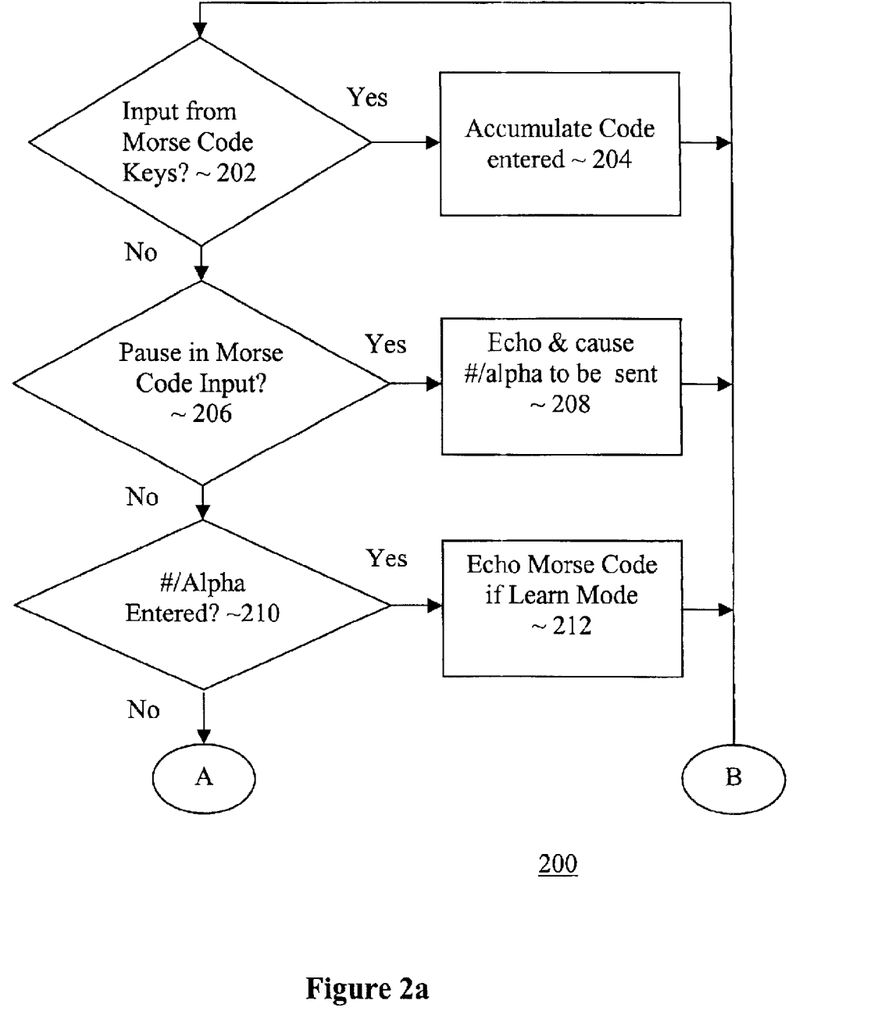
FIGS. 2a–2b illustrate the operational flow of relevant aspects of the Morse code logic provided to the wireless mobile phone of FIGS. 1a/1b, in accordance with one embodiment.
Figure 2B:
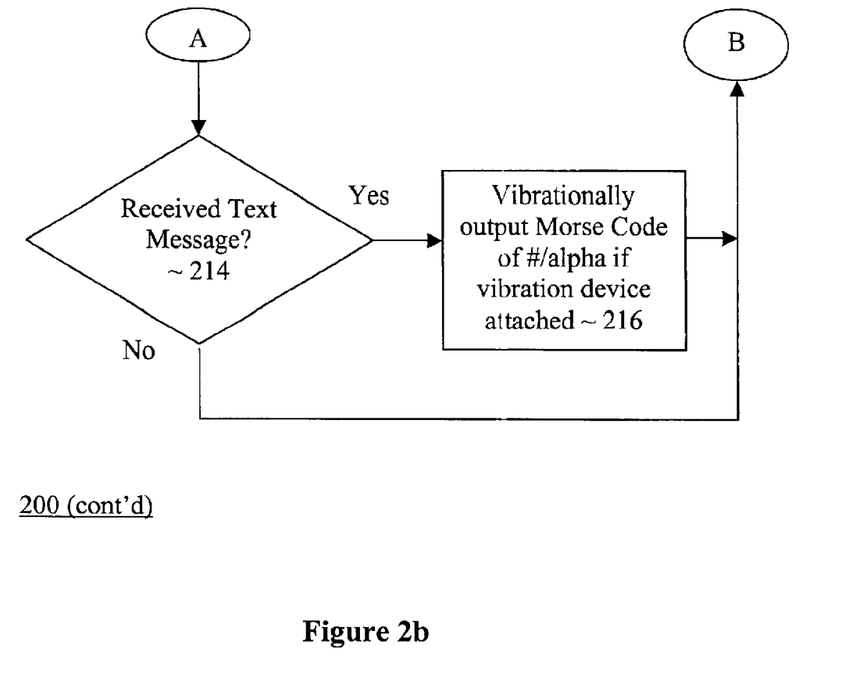

Referring now to FIGS. 2a–2b, wherein the operational flow (200) of the relevant aspects of the complementary logic as it applies to one embodiment of the invention is shown. As illustrated, during operation, the complementary logic continuously checks and determines the operational state of phone 100/100', and acts accordingly. For the illustrated embodiment, the complementary logic first checks to determine if an input has been entered using one of the Morse code buttons 120, block 202. If an input has been entered, the complementary logic accumulates the Morse code input received (until a letter, a number or a punctuation has been inputted), using e.g. an accumulation buffer, block 204.

Back at block 202, if it is determined that a Morse code has not been just inputted, the complementary logic determines if the operational state is considered to be at a pause after a series of successive Morse code inputs have been entered, block 206. If it is determined that the operational state is at such a pause, the complementary logic causes the corresponding alphanumeric data to be injected into the data stream to be transmitted, resulting in their eventual transmission, block 208. The complementary logic also causes the corresponding alphanumeric data to be visually echoed on display 108/108' (based on the accumulated Morse code since the last "refresh" of the accumulation buffer), block 208. Upon echoing, the complementary logic also "clears" the accumulated Morse code inputs.

On the other hand if back at block 206, it was determined that the operational state is not at such a pause, the complementary logic further determines if alphanumeric data has just been entered through input keypad 102/102', block 210. If it is so determined, and assuming the earlier described "learn mode" is enabled, the complementary logic causes the LEDs of buttons 120 to be lit up accordingly (with a pattern of "dit" and "dah") to visually echo the corresponding Morse codes of the entered alphanumeric data, block 212.

Back at block 210, if it was determined that alphanumeric data has not been just entered through input keypad 102/102', the complementary logic further determines if alphanumeric data has just been received from another device, e.g. another phone, block 214. The complementary logic makes the determination by analyzing the received data stream. If so and a vibration device is attached to phone 100/100', the complementary logic vibrationally output the received alphanumeric data by causing the vibration device to vibrationally manifest the corresponding Morse code representation of the received alphanumeric data, block 216.

In each case, upon accumulating an entered Morse code (block 204), echoing the corresponding alphanumeric data of the entered Morse code (block 208), echoing the Morse code of entered alphanumeric data (block 212), or vibrationally output the Morse code representation of received alphanumeric data (block 214), the complementary logic continues operation back at block 202.

Thus, it can be seen from the above description, a user of phone 100/100' may advantageously use the facilities provided to enter and send a text message, by entering their Morse codes, during a call, thereby enabling the user to be able to selectively communicate with the caller/callee in a non-verbal or more private manner.

Figure 3:
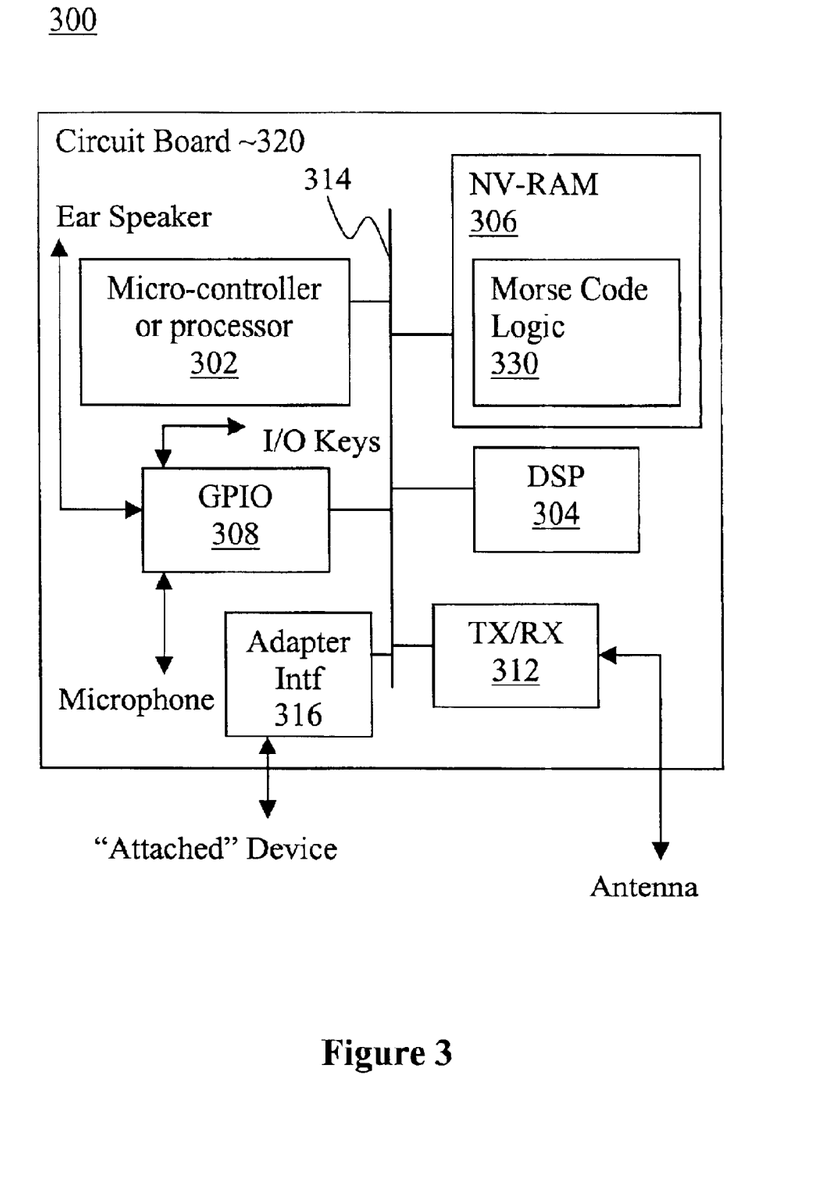
FIG. 3 illustrates an internal component view of the wireless mobile phone of FIGS. 1a/1b, in accordance with one embodiment.

FIG. 3 illustrates an architecture view of a wireless mobile phone 300, in accordance with one embodiment. As illustrated, wireless mobile phone 300 includes elements found in conventional mobile client devices, such as microcontroller/processor 302, digital signal processor (DSP) 304, non-volatile memory 306, general purpose input/output (GPIO) interface 308, transmit/receive (TX/RX) 312 (also known as a transceiver), and adapter interface 316, coupled to each other via bus 314 and disposed on a circuit board 320. Except for the use of GPIO 308 to also interface Morse code buttons 120, and the use of non-volatile memory 306 to host complementary logic 330, the elements are used to perform their conventional functions known in the art. In particular, TX/RX 312 may support one or more of any of the known signaling protocols, including but are not limited to CDMA, TDMA, GSM, and so forth. Their constitutions are known. Accordingly, the elements will not be further described.

Figure 4:
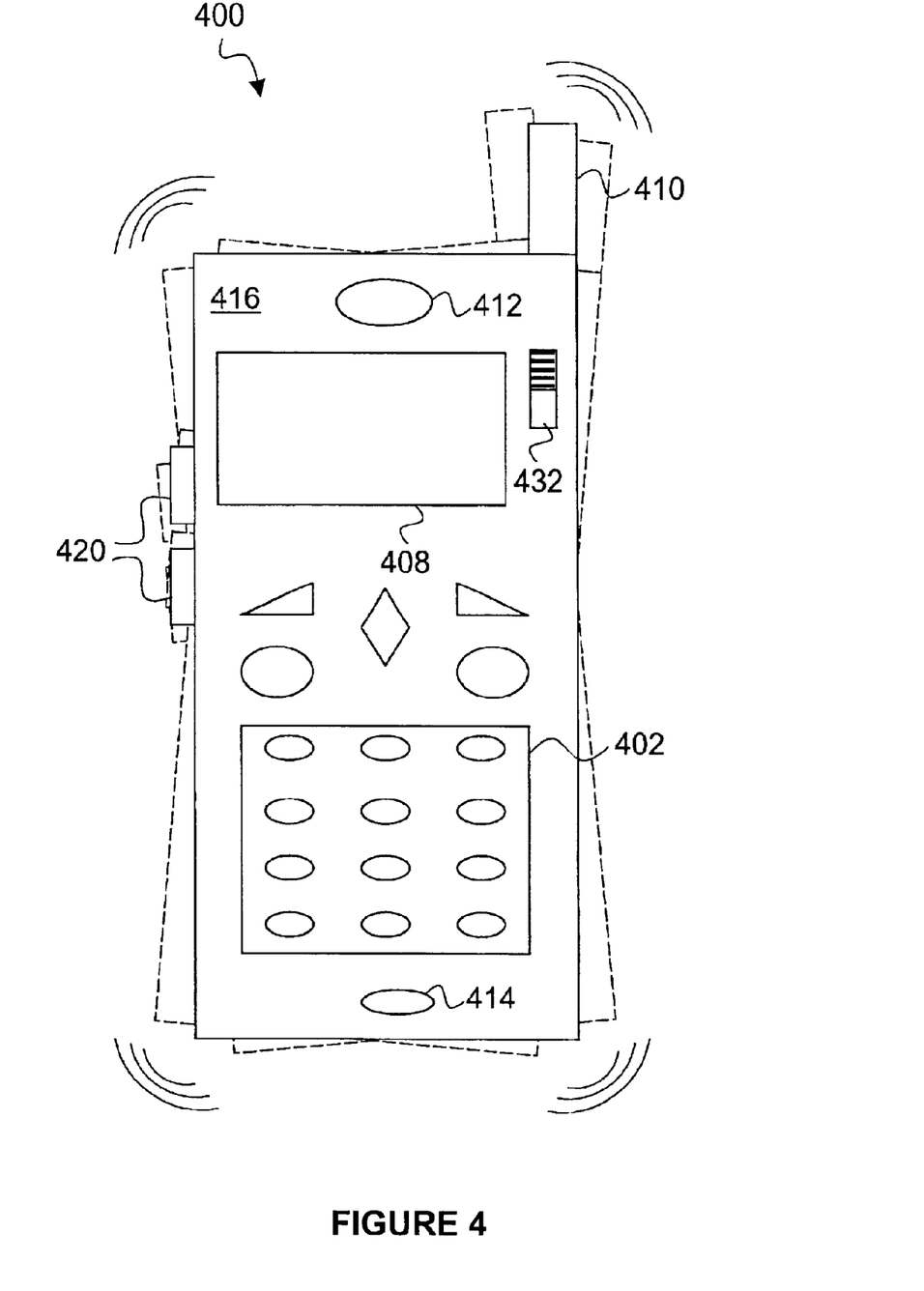
FIG. 4 illustrates a wireless mobile phone incorporated with the vibrational communication facilities of the present invention, in accordance with one embodiment.

FIG. 4 illustrates a wireless mobile phone incorporated with the vibrational communication facilities of the present invention, in accordance with one embodiment. Mobile phone 400 includes many of the features described above with respect to mobile phones 100/100' of FIGS. 1*a*/1*b*. For example, mobile phone 400 includes body casing 416, antenna 410, ear speaker 412, microphone 414, as well as display 408 and input key pad 402 both disposed on the front side of body casing 416. However, mobile phone 400 is additionally equipped with mode switch 432, which facilitates selective operation of mobile phone 400 in at least one of a first non-vibrational operating mode where alphanumeric data received via e.g. antenna 410, input keypad 402, or another communication interface is visually output on display 408, and a second vibrational operating mode where received alphanumeric data is vibrationally output in the form of vibrational representations of the alphanumeric data. Thus, while mobile phone 400 operates in a vibrational operating mode, the received alphanumeric data is vibrationally communicated to a user through the vibrational manifestations of the alphanumeric data to display 408. Of course, while operating in the second vibrational operating mode, mobile phone 400 may also visually output the received alphanumeric data. In one embodiment of the invention, the alphanumeric data is vibrationally output in the form of Morse code vibrational representations. Mobile phone 400 may also be equipped with buttons 420, which in conjunction with included complementary logic, facilitate a user in entering alphanumeric data through entry of their Morse code representations (see Tables I–III), and cause the entered alphanumeric data to be sent to another party, as described above. However, it should be noted that additional buttons 420 are not necessary to practice the vibrational communication aspect of the present invention.

Figure 7:
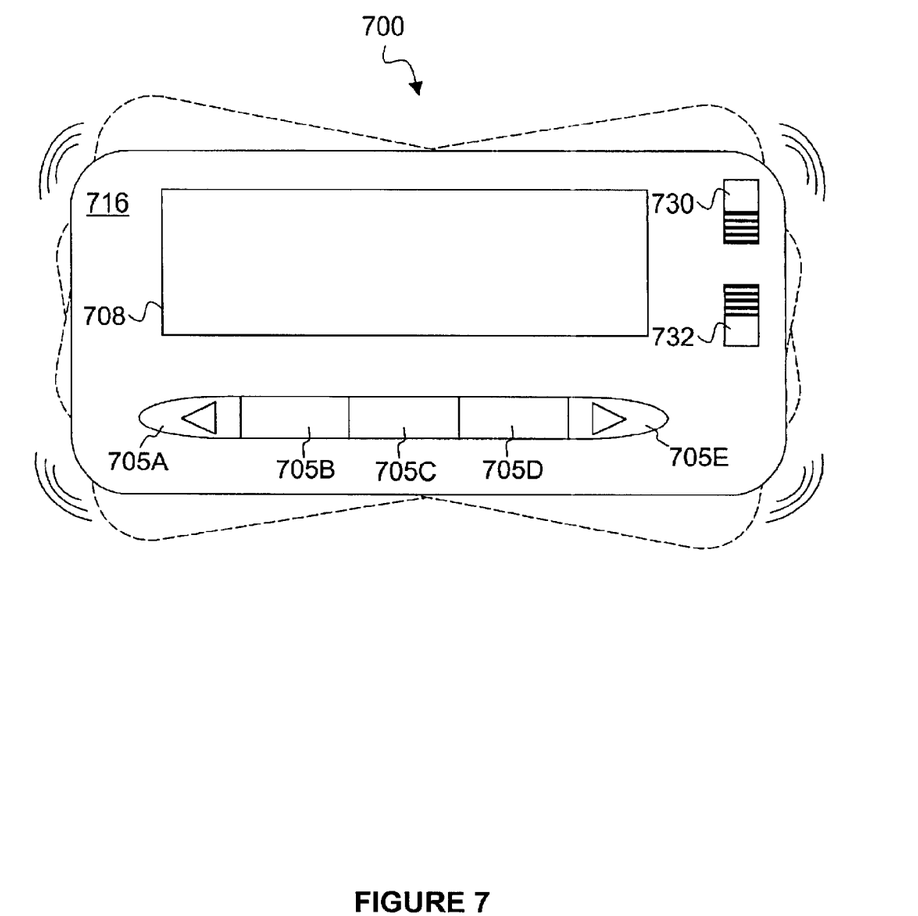
FIG. 7 illustrates a wireless pager incorporated with the vibrational communication facilities of the present invention, in accordance with one embodiment.

Skipping ahead now to FIG. 7, a wireless pager incorporated with the vibrational communication facilities of the present invention, in accordance with one embodiment is illustrated. Wireless pager 700 includes body casing 716, display 708 disposed on the front side of body casing 716, miscellaneous input keys 705A–E, power switch 730 and mode select switch 732. Except for the teachings of the present invention, the items depicted in FIG. 7 all perform their conventional functions and will not be discussed further. In accordance with the teachings of the present invention, mode select switch 732 facilitates switching wireless pager 700 between a first vibrational communication mode and a second non-vibrational communication mode. In one embodiment of the invention, alphanumeric data received by wireless pager 700 via e.g. a communication interface and/or receiver is vibrationally output, in conjunction with a vibration unit and complementary logic (as shown e.g. in FIG. 5), in the form of Morse code vibrational representations. However, as with mobile phone 400, the functionality provided by mode select switch 732 may instead be provided through one or more of miscellaneous input keys 705A–E.

Figure 8:
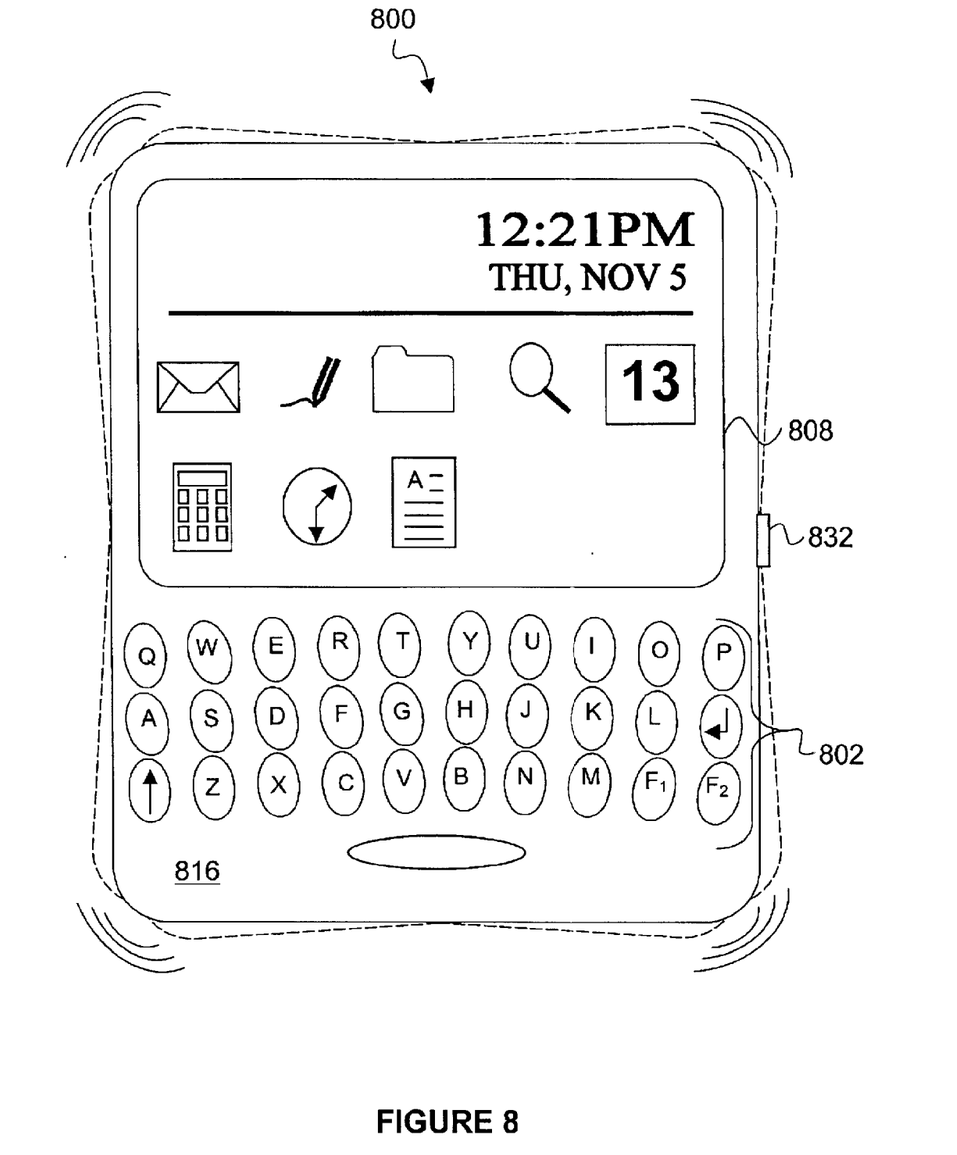
FIG. 8 illustrates a Personal Digital Assistant (PDA) incorporated with the vibrational communication facilities of the present invention, in accordance with one embodiment.

FIG. 8 illustrates a PDA incorporated with the vibrational communication facilities of the present invention, in accordance with one embodiment. PDA 800 is shown including body casing 816, display 808 disposed on the front side of body casing 816, input key pad 802 and mode select switch 832. Except for the teachings of the present invention, the items depicted in FIG. 8 all perform their conventional functions. In accordance with the teachings of the present invention, mode select switch 832 facilitates switching PDA 800 between a first vibrational communication mode and a second non-vibrational communication mode. In one embodiment of the invention, alphanumeric data received by PDA 800 via e.g. a communication interface and/or receiver is vibrationally output in the form of Morse code vibrational representations, in conjunction with a vibration unit and complementary logic (as shown e.g. in FIG. 5). However, as with mobile phone 400 and wireless pager 700, the functionality provided to PDA 800 by mode select switch 832 may instead be provided through one or more keys of input key pad 802, or in the case where display 808 represents a touch screen, the functionality provided by mode select switch 832 may instead be provided through touch input via display 808.

Figure 5:
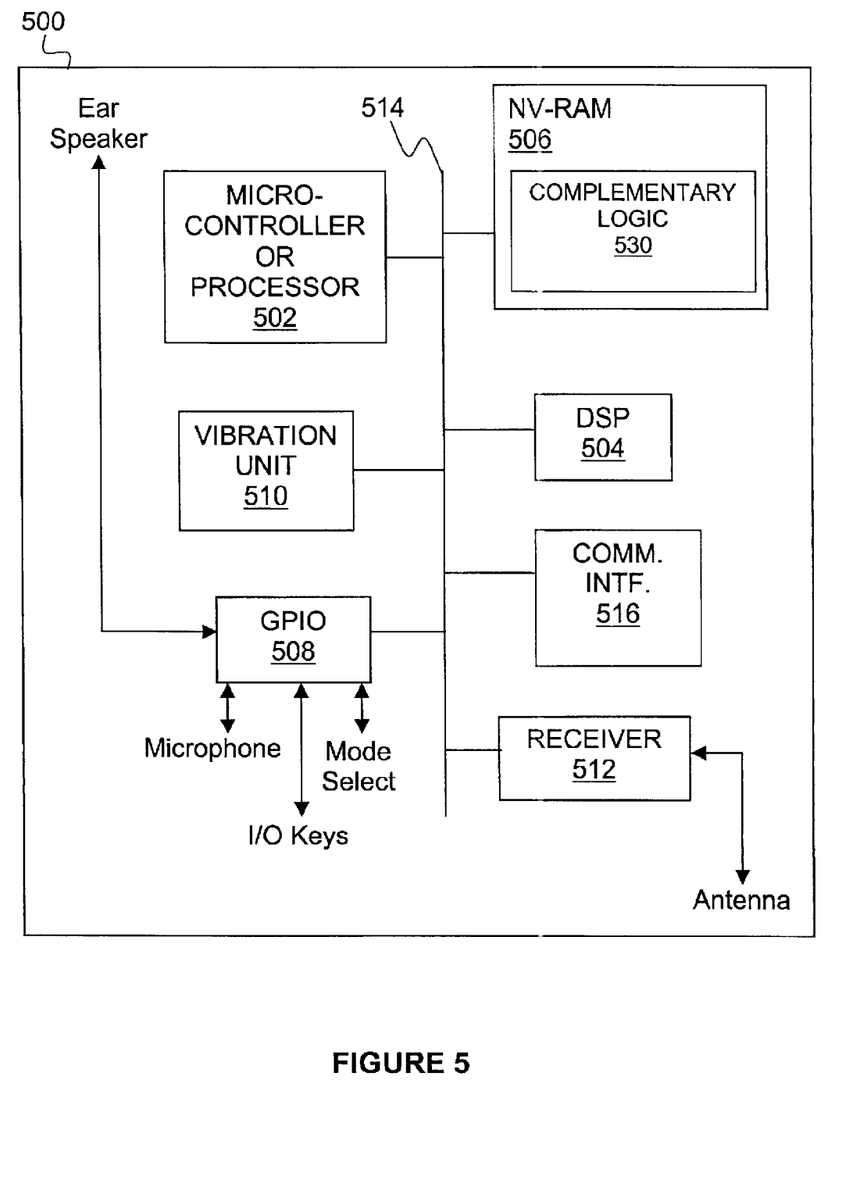
FIG. 5 illustrates an internal component view of a wireless client device, including the vibrational communication facilities of the present invention in accordance with various embodiments.

Referring now back to FIG. 5, an internal component view of a wireless client device such as but not limited to mobile phone 400, wireless pager 700, and PDA 800 is illustrated accordance with various embodiments of the present invention. As illustrated, wireless device 500 includes such elements found in conventional mobile client devices including micro-controller/processor 502, digital signal processor (DSP) 504, communication interface 516, receiver 512, and GPIO 508. Except for the use of GPIO 508 to also interface a mode switch and optional Morse code buttons (as described above), and the use of non-volatile memory 506 to host complementary logic 530, the elements are used to perform their conventional functions known in the art. In particular, receiver 512 may support one or more of any of the known signaling protocols, including but not limited to CDMA, TDMA, GSM, and so forth. In certain embodiments, receiver 512 may be supplemented by a transmitter or replaced by a transceiver. Similarly, communication interface 516 may support one or more wireless communication protocols including but not limited to infrared, Bluetooth, IEEE 802.11b, and so forth. It should be noted that one or more of these elements may be omitted without departing from the spirit and scope of the invention. For example, in the case where wireless device 500 represents a wireless pager such as wireless pager 700, DSP 504 may be omitted. Similarly, in the case where wireless device 500 represents a mobile phone such as mobile phone 400, the ear speaker and microphone may likewise be omitted. As their constitutions are known, these conventional elements will not be further described.

Wireless device 500 additionally includes vibration unit 510, and non-volatile memory 506 coupled to each other via bus 514. Non-volatile memory 506 hosts complementary logic 530, which includes logic to translate incoming alphanumeric text into vibrational control signals which are passed to vibration unit 510. In one embodiment, complementary logic 530 represents instructions, which when executed by processor 502, cause wireless device 500 to output vibrational representations of received alphanumeric data via vibration unit 510. Vibration unit 510 represents a mechanism such as a servomechanism or like device to cause wireless device 500 to vibrate in accordance with control signals received from micro-controller/processor 502 and complementary logic 530. In one embodiment, vibration unit 510 causes wireless device 500 to vibrate at multiple distinct frequencies, where vibrations at each frequency are distinguishable from each other by a user. In one embodiment, vibration unit 510 causes wireless device 500 to vibrate for multiple distinct durations where each vibrational duration is user-distinguishable. In one embodiment, vibration unit 510 causes wireless device 500 to vibrate at any two of the multiple frequencies and/or durations so as to generate Morse code based vibrational representations of received alphanumeric data. For example, in the illustrated embodiment, wireless device 500 may vibrate at one frequency to represent a "dit" and at another frequency to represent a "dah" (as shown in tables I–III), or wireless device 500 may vibrate at a particular frequency for one duration to represent a "dit" and at the same frequency for a second duration to represent a "dah". In one embodiment, the frequencies and/or vibration durations are user-adjustable by way of e.g. a switch and/or dial (not shown). Any one or more components illustrated in FIG. 5 may be disposed on a single circuit board or on multiple circuit boards within a wireless device such as mobile phone 400, wireless pager 700, and PDA 800.

Figure 6:
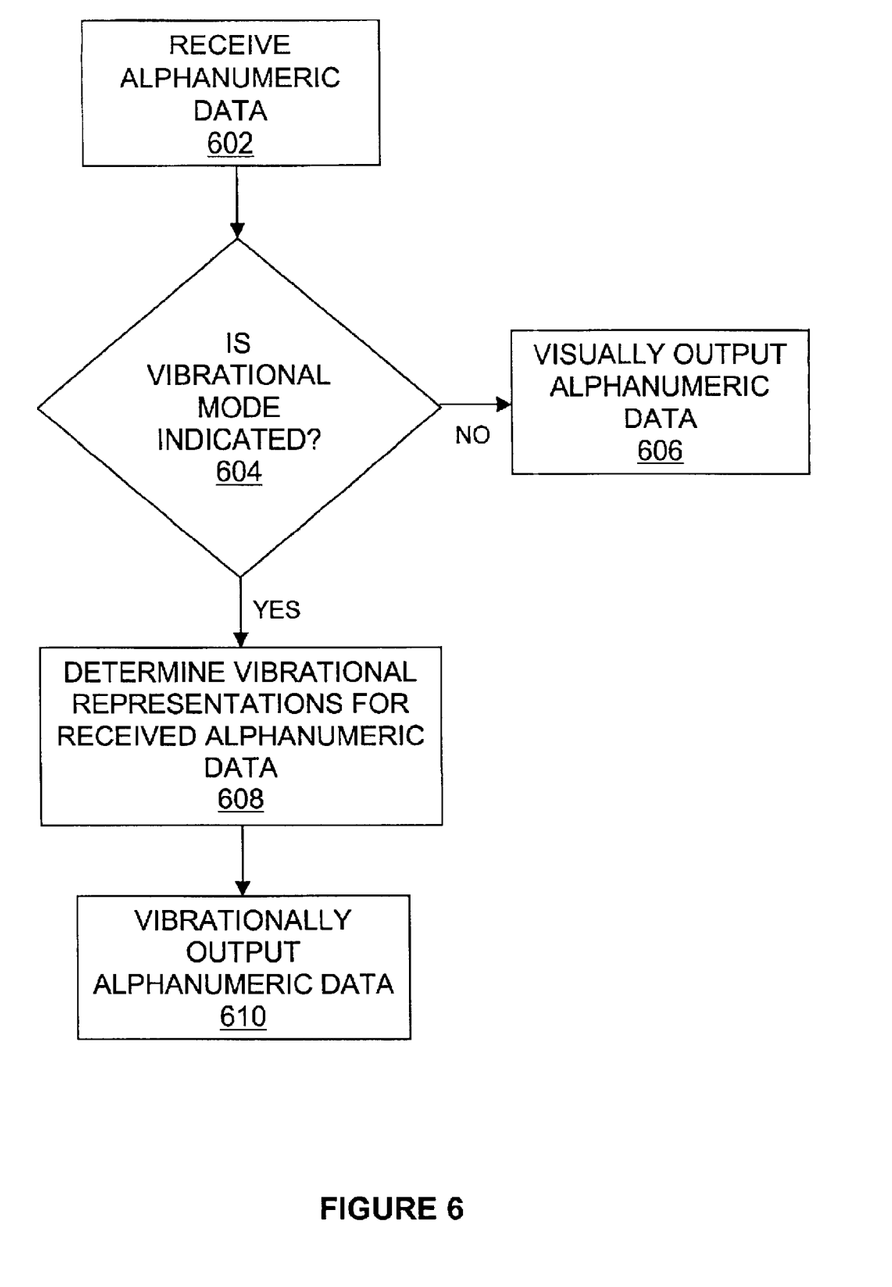
FIG. 6 illustrates an operational flow diagram illustrating the vibrational communication aspect of the present invention, in accordance with one embodiment.

FIG. 6 illustrates an operational flow of the complementary logic as it applies to the vibrational communication aspect of the present invention in accordance with one embodiment. The process begins at block 602 with wireless device 500 receiving alphanumeric data. As alluded to above, wireless device entitled "A Wireless Mobile Phone With Morse Code and Related Capabilities" filed on Jan. 22, 2001 by Walter G. Bright, et al., and commonly assigned to the assignee of the present application. 500 may receive such alphanumeric data in any number of ways including by way of signals received through an antenna and receiver 512, as well as through GPIO 508 and/or communication interface 516 in accordance with a wide variety of wireless communication protocols. At block 604, a determination is made as to whether or not wireless device 500 is set to operate in a vibrational operating mode. Such a determination may be achieved by e.g. examining the status of a mode switch such as mode switch 432, 732 and 832. However, it should be noted that a dedicated mode switch is not required as such operational mode settings may be entered by an individual through e.g. a standard input key pad and/or one or more existing I/O keys. If mobile phone 400 is not set to operate in a vibrational operating mode, the received alphanumeric data is visually output to a display, block 606. However, if wireless device 500 is set to operate in a vibrational operating mode, complementary logic 530 determines vibrational representations of the received alphanumeric data (block 608) and causes vibration unit 510 to output such vibrational representations of the received alphanumeric data, block 610. Thus, in accordance with the teachings of the present invention, an individual may receive private, alphanumeric messages via a wireless communication device such as but not limited to a mobile phone, wireless pager, and a PDA without the need to view the wireless communication device.

Thus, various wireless devices having vibration communication capabilities have been described. While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A wireless mobile phone comprising:
   a body casing having a front surface;
   a transceiver to send and receive signals for text messages with alphanumeric data;
   a vibrator coupled to said body casing to vibrate said wireless mobile phone; and
   means coupled to said vibrator and said transceiver for vibrationally outputting the received text messages with alphanumeric data through vibrational manifestation of the alphanumeric data of the received text messages using the vibrator.

2. The wireless mobile phone of claim 1, wherein said means for vibrationally outputting the alphanumeric data of the receive text messages comprises means for outputting Morse code representations of the alphanumeric data of the received text messages.

3. The wireless mobile phone of claim 1, wherein said vibrator is disposed within said body casing.

4. The wireless mobile phone of claim 1, wherein said means for vibrationally outputting the alphanumeric data of the received text messages comprises means for vibrationally outputting the alphanumeric data of the text messages received via said transceiver.

5. The wireless mobile phone of claim 1, further comprising an input keypad disposed on said front surface of said body casing to facilitate entry of alphanumeric data, and wherein said means for vibrational output is further adapted to vibrationally output alphanumeric data of a text message composed using said input keypad.

6. A wireless mobile phone comprising:
   a body casing;
   a transceiver to send and receive signals for text messages with alphanumeric data;
   a vibrator coupled to said body casing to vibrate said wireless mobile phone;
   a storage medium having stored therein a plurality of programming instructions, which when executed cause the wireless mobile phone to vibrationally output the received text messages with alphanumeric data through vibrational manifestation of the alphanumeric data of the received text messages using the vibrator; and an execution unit coupled to the storage medium for executing the plurality of programming instructions.

7. The wireless mobile phone of claim 6, further comprising a switch coupled to said vibrator for switching between a first vibrational operating mode wherein said wireless mobile phone vibrationally outputs the alphanumeric data of the received text messages, and a second non-vibrational mode Wherein said wireless mobile phone visually outputs the alphanumeric data of the received text messages.

8. The wireless mobile phone of claim 6, wherein said plurality of programming instructions comprises programming instructions, which when executed cause the wireless mobile phone to vibrationally output Morse code representations of the alphanumeric data of the received text messages.

9. In a wireless mobile phone, a method comprising:
receiving signals representing text messages with alphanumeric data;
determining if the mobile phone is operating in a vibrational output mode; and
identifying vibrational representations of at least a portion of the alphanumeric data of the received text messages and outputting the vibrational representations if the mobile phone is operating in a vibrational output mode.

10. The method of claim 9, further comprising visually utputting the alphanumeric data of the received text messages if the mobile phone is operating in a non-vibrational output mode.

11. The method of claim 9, further comprising: vibrationally outputting Morse code representations of said alphanumeric data of the text messages if the mobile phone is operating in the vibrational output mode.

12. A wireless pager comprising:
a receiver to receive signals for text messages with alphanumeric data;
a body casing;
a vibrator coupled to said body casing to vibrate said wireless pager; and
means coupled to said vibrator and said receiver for vibrationally outputting the alphanumeric data of the received text messages via said receiver through vibrational manifestation of the alphanumeric data of the received text messages using the vibrator.

13. The wireless pager of claim 12, further comprising a transmitter to transmit signals.

14. The wireless pager of claim 12, further comprising means coupled to said vibrator for switching between a first vibrational operating mode wherein said wireless pager vibrationally outputs the alphanumeric data of the received text messages, and a second non-vibrational mode wherein said wireless pager visually outputs the alphanumeric data of the received text messages.

15. The wireless pager of claim 12, wherein said mean for vibrationally outputting the alphanumeric data of the received text messages comprises means for vibrationally outputting the alphanumeric data of the received text messages through vibrational manifestation of the Morse code representations of the alphanumeric data of the received text message.

16. The wireless pager of claim 12, wherein said vibrator is disposed within said body casing.

17. A wireless pager comprising:
a receiver to receive signals of text messages with alohanumeri data;
a body casing;
a vibrator coupled to said body casing to vibrate said wireless pager;
a storage medium having stored therein a plurality of programming instructions, which when executed cause the wireless pager to vibrationally output the alphanumeric data of the received text messages through vibrational manifestation of the alphanumeric data of the received text messages using the vibrator; and
an execution unit coupled to the storage medium for executing the plurality of programming instructions.

18. The wireless pager of claim 17, further comprising a switch coupled to said vibrator for switching between a first vibrational operating mode wherein said wireless pager vibrationally outputs the alphanumeric data of the received text messages, and a second non-vibrational mode wherein said wireless pager visually outputs the alphanumeric data of the received text messages.

19. The wireless pager of claim 17, wherein said plurality of programming instructions comprises programming instructions, which when executed cause the wireless pager to vibrationally output Morse code representations of the alphanumeric data of the received text messages.

20. In a wireless pager, a method comprising:
receiving signals representing text messages with alphanumeric data;
determining if the wireless pager is operating in a vibrational output mode; and
identifying vibrational representations of at least a portion of the alphanumeric data of the text messages, and outputting the vibrational representations if the wireless pager is operating in a vibrational output mode.

21. The method of claim 20, further comprising visually outputting the alphanumeric data of the text messages if the wireless pager is operating in a non-vibrational output mode.

22. The method of claim 20, further comprising: vibrationally outputting Morse code representations of said alphanumeric data of the received text messages if the wireless pager is operating in the vibrational output mode.

23. A Personal Digital Assistant (PDA) comprising:
a receiver to receive signals of text messages with alphanumeric data;
a body casing having front surface;
a vibrator coupled to said body casing to vibrate said PDA; and
means coupled to said vibrator and to said receiver for vibrationally outputting the alphanumeric data of the received text messages via said receiver through vibrational manifestation of the alphanumeric data of the received text messages using the vibrator.

24. The PDA of claim 23, wherein said means for vibrational outputting the alphanumeric data of the text messages comprises means for vibrationally outputting the alphanumeric data of the text messages through vibrational manifestation of the Morse code representations of the alphanumeric data of the text messages.

25. The PDA of claim 23, wherein said vibrator is disposed within said body casing.

26. The PDA of claim 23, further comprising an input keypad disposed on said front surface of said body casing to facilitate entry of alphanumeric data to compose a text message, and wherein said means for vibrational output is further adapted to vibrationally output the alphanumeric data of the text message inputted using said input keypad.

27. A PDA comprising:
a receiver to receive signals of text messages with alphanumeric data;

a body casing having front surface;

a vibrator coupled to said body casing to vibrate said PDA;

a storage medium having stored therein a plurality of programming instructions, which when executed cause the PDA to vibrationally output the alphanumeric data of the received text messages through vibrational manifestation of the alphanumeric data of the received text messages using the vibrator; and an execution unit coupled to the storage medium for executing the plurality of programming instructions.

28. The PDA of claim 27, further comprising a switch coupled to said vibrator for switching between a first vibrational operating mode wherein said PDA vibrationally outputs the alphanumeric data of the received text message, and a second non-vibrational mode wherein said PDA visually outputs the alphanumeric data of the received text message.

29. The PDA of claim 27, wherein said plurality of programming instructions comprises programming instructions, which when execute cause the PDA to vibrationally output Morse code representations of the alphanumeric data of the received text messages.

30. In a PDA, a method comprising:

receiving signals representing text messages with alphanumeric data;

determining if the mobile phone is operating in a vibrational output mode; and identifying vibrational representations of at least a portion of the alphanumeric data of the text messages and outputting the vibrational representations if the PDA is operating in a vibrational output mode.

31. The method of claim 30, further comprising visually outputting the alphanumeric data of the text messages if the PDA is operating in non-vibrational output mode.

32. The method of claim 30, further comprising: vibrationally outputting Morse code representations of said alphanumeric data of the text message if the PDA is operating in the vibrational output mode.

33. A wireless communication device comprising:

a receiver to receive signals of text messages with alphanumeric data;

a body casing;

a vibrator coupled to said body casing to vibrate said wireless communication device;

a storage medium having stored therein a plurality of programming instructions, which when executed cause the wireless communication device to vibrationally output the alphanumeric data of the received text messages through vibrational manifestation of the alphanumeric data of the received text message using the vibrator; and an execution unit coupled to the storage medium for executing the plurality of programming instructions.

34. The wireless communication device of claim 33, wherein the vibrator causes wireless communication device to vibrate at multiple distinct frequencies, wherein vibrations at each frequency are user distinguishable.

35. The wireless communication device of claim 34, wherein the vibrator causes the wireless communication device to vibrate at any two of the multiple frequencies so as to generate Morse code based vibrational representations of the alphanumeric data of the received text message.

36. The wireless communication device of claim 33, wherein the vibrator causes wireless communication device to vibrate for multiple distinct durations wherein each vibrational duration is user-distinguishable.

37. The wireless communication device of claim 36, wherein the vibrator causes the wireless communication device to vibrate at any two of the multiple distinct durations so as to generate Morse code based vibratiorrial representations of the alphanumeric data of the received text message.

38. In a wireless communication device, a method comprising:

receiving signals representing text messages with alphanumeric data;

determining if the wireless communication device is operating in a vibrational output mode; and identifying vibrational representations of at least a portion of the alphanumeric data of the text messages and outputting the vibrational representations if the wireless communication device is operating in a vibrational output mode.

* * * * *